US012576002B2

(12) United States Patent
Watts-Russell et al.

(10) Patent No.: US 12,576,002 B2
(45) Date of Patent: Mar. 17, 2026

(54) LACTATION AID AND BREAST TISSUE THERAPEUTIC DEVICE

(71) Applicant: LACTAMO HOLDINGS PTY LTD, Sydney (AU)

(72) Inventors: Henrietta Rose Watts-Russell, Manly (AU); Gregory James Roger, North Sydney (AU)

(73) Assignee: LACTAMO HOLDINGS PTY LTD, Sydney (AU)

( * ) Notice: Subject to any disclaimer, the term of this patent is extended or adjusted under 35 U.S.C. 154(b) by 1007 days.

(21) Appl. No.: 17/264,374

(22) PCT Filed: Jul. 30, 2019

(86) PCT No.: PCT/AU2019/050795
§ 371 (c)(1),
(2) Date: Jan. 29, 2021

(87) PCT Pub. No.: WO2020/024004
PCT Pub. Date: Feb. 6, 2020

(65) Prior Publication Data

US 2021/0298988 A1 Sep. 30, 2021

(30) Foreign Application Priority Data

Aug. 1, 2018 (AU) ................................ 2018902800

(51) Int. Cl.
*A61H 15/02* (2006.01)
*A61H 15/00* (2006.01)

(52) U.S. Cl.
CPC ......... *A61H 15/02* (2013.01); *A61H 15/0092* (2013.01); *A61H 2015/0042* (2013.01);
(Continued)

(58) Field of Classification Search
CPC ...... A61H 15/02; A61H 15/0085–0092; A61H 2015/0042; A61H 2015/0071;
(Continued)

(56) References Cited

U.S. PATENT DOCUMENTS 5,577,995 A 11/1996 Walker et al.
7,517,324 B2 * 4/2009 Cohen .................... A61H 7/001 601/135
(Continued)

FOREIGN PATENT DOCUMENTS

CN 19980067332 A * 10/1998
CN 2652376 Y 11/2004
(Continued)

OTHER PUBLICATIONS

Machine translation of CN 104053531 A description accessed Dec. 1, 2023 (Year: 2023).*
(Continued)

*Primary Examiner* — Timothy A Stanis
*Assistant Examiner* — Kira B Daher
(74) *Attorney, Agent, or Firm* — Bookoff McAndrews, PLLC

(57) ABSTRACT

A lactation aid is disclosed having an outer layer defining a cavity and a core material located in the cavity, the core material being adapted to be one or more of: heated and cooled. The lactation aid is adapted to be manually rolled over a breast. The lactation aid may include protrusions, which protrusions may be hollow such that core material at least partially extends into the protrusions. A temperature indicator may also be present. The lactation aid may combine three therapeutic components: application of temperature (heating or cooling), movement and compression to breast tissue.

15 Claims, 5 Drawing Sheets

(52) U.S. Cl.
CPC ................ *A61H 2015/0071* (2013.01); *A61H 2201/0153* (2013.01); *A61H 2201/0207* (2013.01); *A61H 2201/0214* (2013.01); *A61H 2201/0292* (2013.01); *A61H 2201/1253* (2013.01); *A61H 2201/1695* (2013.01); *A61H 2205/082* (2013.01)

(58) Field of Classification Search
CPC .... A61H 2015/0007; A61H 2015/0057; A61H 2201/0153; A61H 2201/0207; A61H 2201/0214; A61H 2201/1253; A61H 2201/1695; A61H 2201/0292; A61H 2201/0157; A61H 2201/0278; A61H 2201/169; A61H 2201/5082; A61H 2201/02; A61H 2205/082; A61H 7/001; A61F 7/02; A61F 2007/0021; A61F 2007/0242; A61F 2007/108; A61M 1/06–0697
See application file for complete search history.

(56) References Cited

U.S. PATENT DOCUMENTS

| | | | | |
|---|---|---|---|---|
| 2003/0010744 | A1* | 1/2003 | Ma | B65D 1/0223 215/382 |
| 2004/0074629 | A1* | 4/2004 | Noel | F28D 20/026 165/10 |
| 2004/0249322 | A1* | 12/2004 | Cohen | A61H 15/00 601/131 |
| 2005/0222536 | A1* | 10/2005 | Silver | A61M 1/064 604/74 |
| 2008/0039747 | A1* | 2/2008 | Baerwalde | A61H 15/02 601/118 |
| 2012/0172771 | A1* | 7/2012 | Jian | A61H 15/0092 601/46 |
| 2012/0209363 | A1 | 8/2012 | Williams, III et al. | |
| 2014/0358202 | A1 | 12/2014 | Zanella | |
| 2015/0005683 | A1* | 1/2015 | Balducci | A61H 15/00 601/134 |
| 2015/0272774 | A1 | 10/2015 | Lee | |
| 2016/0361223 | A1* | 12/2016 | Muller | A61H 15/00 |
| 2017/0196765 | A1 | 7/2017 | Hagaman | |
| 2018/0055724 | A1 | 3/2018 | Slocum et al. | |

FOREIGN PATENT DOCUMENTS

| | | | | | |
|---|---|---|---|---|---|
| CN | 104053531 | A | * | 9/2014 | A61B 5/681 |
| CN | 204890531 | U | * | 12/2015 | |
| CN | 106102683 | A | * | 11/2016 | A61H 1/008 |
| DE | 202016006073 | U1 | * | 12/2016 | |
| JP | H1176348 | A | | 3/1999 | |
| JP | 3124320 | U | | 8/2006 | |
| JP | 3125522 | U | | 9/2006 | |

OTHER PUBLICATIONS

Machine translation of CN 204890531 U description accessed Dec. 5, 2023 (Year: 2023).*
Machine translation of KR 19980067332 A accessed Dec. 5, 2023 (Year: 2023).*
Machine translation of CN 106102683 A accessed Dec. 5, 2023 (Year: 2023).*
DE-202016006073-U1 description (Year: 2016).*
Office Action in CN application 201980056109.8, dated Dec. 5, 2022 (with English translation). .
International Search Report and Written Opinion in corresponding Application No. PCT/AU2019/050795, dated Sep. 25, 2019 (11 pages).
Third Office Action in CN Application 201980056109.8, dated Apr. 7, 2024.

* cited by examiner

LACTATION AID AND BREAST TISSUE THERAPEUTIC DEVICE

CROSS REFERENCE TO RELATED APPLICATIONS

The present application is a 371 National Phase of Application No. PCT/AU2019/050795, filed Jul. 30, 2019, which claims the benefit Australian provisional patent application no. 2018902800, filed on 1 Aug. 2018, of which the '800 application is incorporated herein by reference in its entirety.

TECHNICAL FIELD

This present disclosure relates to the promotion of lactation and/or treatment of conditions associated with lactation and affecting breast tissue.

BACKGROUND

During normal lactation, milk is secreted by mammary glands located within breast tissue. Milk then flows by the action of smooth muscle contractions along the lactiferous ducts (milk ducts) and the nipple pores to a suckling infant. However, there are a number of problems that may arise that are associated with lactation.

Problems can include oedema (breast engorgement), blocked milk ducts (caused by stagnation of breastmilk), breast infections, insufficient milk production or drainage and serious medical problems such as mastitis, breast abscesses, and cysts. Mastalgia (breast pain) is commonly associated with affected portions of the breast. Contributing factors can include busy lifestyles, exhaustion, allergies, stresses, restrictive clothing and predispositions.

Many of the problems associated with lactation can be prevented or alleviated through regular and effective emptying of breast milk. However, where this is not possible or does not solve problems, there is a need for alternative solutions.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

SUMMARY

In one aspect, the present disclosure provides a lactation aid comprising:

- an outer layer defining a cavity; and
- a core material located in the cavity, the core material being adapted to be one or more of: heated and cooled;
- wherein the lactation aid is adapted to be manually rolled over a breast.

In another aspect, the present disclosure provides a method of aiding lactation, the method comprising:

- manually rolling the lactation aid to a breast, the lactation aid comprising:
- an outer layer defining a cavity; and
- a core material located in the cavity, the core material being adapted to be one or more of: heated and cooled.

During rolling of the lactation aid over the breast, it may be pressed between the surface of the breast and a user's hand during application. The lactation aid may be rolled over different areas of the breast in one or more random directions and/or different directions as required. Nevertheless, applying of the lactation aid is not necessarily limited to a rolling action only. For example, the lactation aid may, additionally or alternatively, be pressed, twisted or rubbed against the breast. When applied to the breast, heat may be transferred to or from breast tissue, lateral movement may be applied to breast tissue and compression may be applied to breast tissue.

The lactation aid may combine three critical therapeutic components: application of temperature (heating or cooling), movement and compression to breast tissue. As a result, the lactation aid may be used, for example, to stimulate milk production and flow, aid the let-down reflex; help clear blocked milk ducts; help with oversupply of milk and engorgement; relieve swelling and pain associated with breast feeding or lactation; help fight off infection and prevent escalation of breast swelling (assisting opening of milk ducts and flow); and/or increase the quality of milk by increasing total solids, lipids, and casein concentration and gross energy. Therapy may be further enhanced by one or more of the features described hereinbelow.

In one embodiment, the outer layer of the lactation aid comprises a plurality of protrusions extending radially outwards from an exterior surface of the outer layer. The protrusions may be distributed over the exterior surface of the outer layer in a regular or irregular pattern. During use, the protrusions may press into breast tissue, providing for enhanced movement and/or compression of breast tissue. The protrusions may be spikes, lumps or bumps or a combination thereof. The protrusions may have a rounded shape with no sharp edges. The protrusions may be integrally formed with the exterior surface of the outer layer, for example. The protrusions may have a height of at least 1 mm, at least 2 mm or at least 3 mm. The protrusions may have a height of less than 10 mm, less than 8 mm or less than 6 mm. For example, the protrusions may have a height of about 2 mm, 3 mm, 4 mm, 5 mm or otherwise.

One or more of the protrusions may be hollow. The cavity defined by the outer layer may reach into the protrusions. The core material may therefore extend at least partially into the hollow protrusions. The hollow protrusions may enable heated or cooled core material to be as close as possible to breast tissue, e.g., as opposed to being spaced from the breast tissue by the protrusions. Moreover, it may ensure that the outer layer maintains substantially the same thickness around its entire (three-dimensional) circumference, even where it provides protrusions. The outer layer may have substantially the same thickness at areas where protrusions are formed and at areas with no protrusions. The outer layer may therefore have more uniform flexibility and/or compressibility over its surface.

The outer layer may comprise different sections (e.g. halves, thirds or quarters of the outer layer) having different configurations and/or properties from one other. For example, different numbers, sizes and/or distribution patterns of protrusions may be present at different sections of the outer layer. Additionally or alternatively, the different sections of the outer layer may be formed of material having different properties, e.g., hardness properties. In some embodiments, the different sections may be separately formed and connected together to form the outer layer and the cavity. By providing different sections with different configurations and/or properties, the lactation aid may provide for different therapeutic benefits; the different sections may offer different temperature, movement and/or compression characteristics. The different benefits may be experienced during a single use of the lactation aid, e.g., by the different sections being rolled one after the other over the breast, or be selectively experienced, by only one or a select group of sections being applied to the breast and not one or more other sections.

In one embodiment, the outer layer includes a first section and a second section. A first subset of protrusions is distributed at the first section and a second subset of protrusions is distributed at the second section. The first subset of protrusions may each have a first height and the second set of protrusions may each have a second height different from the first height. The difference between the first height and the second height may be at least 0.5 mm, at least 1 mm or at least 1.5 mm, for example. The first and second portions may be first and second halves, respectively, of the outer layer.

Prior to application of the lactation aid to the breast, the core material may be placed in a heated or cooled state. The lactation aid may be applied to breast tissue when the core material is in the heated or cooled state.

For example, the core material may be heated to a desired, therapeutic temperature that is substantially above the surrounding room or atmospheric temperature, e.g. at least 5° C., at least 10° C., at least 15° C., at least 20° C., at least 30° C., at least 40° C., at least 50° C., or at least 60° C. above the room or atmospheric temperature. For example, the core material may be heated to a desired temperature of at least 25° C., at least 30° C., at least 35° C., at least 40° C., at least 50° C., at least 60° C., at least 70° C., or at least 80° C. Heating the core material to the desired temperature may comprise heating using an electrical heating device such as a microwave oven or other type of oven, heating by immersion in a hot fluid such as hot water, or otherwise.

As another example, the core material may be cooled to a desired, therapeutic temperature that is substantially below the surrounding room or atmospheric temperature, e.g. at least 5° C., at least 10° C., at least 15° C., or at least 20° C. below the room or atmospheric temperature. For example, the core material may be cooled to a desired temperature of below 15° C., below 10° C., below 5° C., or below 0° C. In some embodiments, the core material may be frozen. Cooling the core material to the desired temperature may comprise cooling using an electrical refrigeration device (e.g. placing the aid in a fridge or freezer), cooling by immersion in a cold fluid such as cold water, or otherwise.

Nevertheless, in some embodiments, the core material may have "instant" heating or cooling properties. For example, the lactation aid may be configured so that an exothermic or endothermic reaction can be triggered to cause instant heating or instant cooling of the core material. In this regard, the lactation aid may comprise core material and/or additional trigger elements that are common to "instant heat packs" or "instant cool packs" that are known in the art. Moreover, in some embodiments, use of the lactation aid at room temperature is not precluded.

In some embodiments, the lactation aid may be used with a bespoke heating or cooling device, which may have a chamber specifically design for receiving the lactation aid. The chamber may be surrounded by walls of a high thermal density which can retain a heated or cooled state for a long period of time. The lactation aid may be repeatedly placed into the chamber to be re-heated or re-cooled.

The outer layer may be thermally conductive so that it can be directly cooled or heated at least partially by the same method as the core material and/or so that heat is transferred from or lost to the core material. The core material may have a relatively high thermal density or high specific heat capacity such that it may be maintained at or close to the desired temperature for a relatively long period. The core material may be adapted to be one or more of: repeatedly heated and repeatedly cooled. For example, if the lactation aid returns to room/atmospheric temperature, it may reheated or re-cooled. Accordingly, the lactation aid may be a re-usable.

The core material may be a liquid or fluid. For example, the core material may be water, a saline solution, or a gel. In some embodiments, the core material may comprise propylene glycol, calcium chloride, magnesium sulphate, ammonium nitrate or a combination thereof.

The lactation aid may be ball-shaped. The shape of the lactation aid as defined by an exterior surface of the outer layer may be substantially spheroidal, e.g., shaped as a prolate spheroid, oblate spheroid or a sphere. However, in some embodiments, the lactation aid may not be substantially spheroidal or ball-shaped. For example, it may have a substantially cylindrical shape, elongate shape, ovoid or egg-shape, regular or irregular shape or otherwise. The inclusion of protrusions at the exterior surface, while potentially irregular in nature, may not disguise the general shape of the lactation aid. The shape of the lactation aid may make it particularly suitable for rolling over the breast.

A maximum diameter of the lactation aid as defined by the outer layer may be between about 20 mm and 60 mm, between about 40 mm and 60 mm, between about 45 mm and 55 mm, or about 45 mm, about 50 mm or about 55 mm, for example. The lactation aid may therefore be relatively small, having a diameter that may be similar to a standard golf ball (about 43 mm), for example, while being significantly smaller than a standard tennis ball (about 67 mm). The size of the lactation aid may make it particularly suitable for use in rolling over a breast and also to be applied in hard to reach areas such as the mammalian fold, for example. The relatively small size may reduce a risk of the lactation aid interfering with other activities such as holding of a baby, breastfeeding, pumping or showering etc., when those activities are carried out concurrently.

The outer layer of the lactation aid may be soft and/or resiliently flexible. The outer layer may be formed of silicone, rubber, polyethylene, nylon, a thermoplastic polyamide, phthalate free vinyl chloride or a combination thereof. The outer layer may have a Shore 00 hardness of between 15 and 80, between 20 and 65, between 20 and 50 or between 2 and 40, for example. The outer layer may have a hardness between Shore 00 of 20 and Shore A of 20, for example. The outer layer may be relatively thin, e.g. by having a thickness of less than 3 mm, less than 2 mm or less than 1 mm in depth.

The softness of the outer layer of the lactation aid, and the choice of core material such as gel or other fluid/liquid, may provide the lactation aid with a "jelly-like" nature. The lactation aid as a whole may be substantially soft and relatively easily compressed or deformed. The lactation aid may be considered "squidgy" or "squashy". The core material may not fill the cavity of the outer layer at a high pressure. At room temperature, the core material may be substantially at atmospheric pressure. The core material may not inflate the outer layer by stretching the outer layer, but rather fill the cavity to a maximum diameter as defined by the natural shape and size of the outer layer.

In some embodiments, the lactation aid may have a modulus of elasticity that substantially matches the perceived/required modulus of elasticity of the breast/breast tissue. For example, the modulus of elasticity of the lactation aid may be between 0.5 kPa (lower level for adipose tissue) and 3,000 kPa (upper level for skin). For example, the modulus of elasticity of the lactation aid may be less than 3,000 kPa, less than 2,500 kPa, less than 1,000 kPa, less than 500 kPa, less than 100 kPa, less than 50 kPa, less than 25 kPa, less than 10 kPa or otherwise.

In some embodiments, the outer layer may be variable in stiffness and, in addition to the character of the core material, this may be so that the lactation aid has a "maximal pressure" that it can exert on breast tissue, no matter how hard the ball is pressed to tissue, by allowing flaccid expansion of the outer layer when a deemed maximal pressure is reached. This may be used to reduce the possibility of harmful pressure being applied to the breast tissue.

In some methods of the present disclosure, an instrumented version (or calibration version) of the lactation aid may be used, in conjunction with a therapeutic version, to measure breast tissue compliance and guide the correct selection of the parameters of the outer layer, core material and temperature settings, as described herein. This instrumented version may be re-usable and covered by a hygienic sleeve for use in a commercial or clinical setting.

In some embodiments, the core material may have variable elastic properties. These non-linear properties may be thixotropic (to allow for softening and broadening of the applied force to the breast where excessive force may be painful or harmful—this is similar to the material property of toothpaste for example), non-Newtonian where the increased application of deformation serves to stiffen the material (much as cornflour and water behaves) and in this fashion may "sharpen" or increase the effective application of force, much as may be required to dislodge a blockage, or a combination of these, where the material behaves elastically then becomes either of thixotropic or non-Newtonian or both at differing rates of application.

The core material may be thermoplastic so it can be set to different elasticities at different temperatures. This accounts for the fact that different breasts have different moduli, that within any one breast there may be variable regions of stiffness, and that various disease states and normal physiological variations (such occur during lactation) may be present and thereby require differing treatment elasticities. These differing elastic states may be signified by differing temperature measurement properties, which may be observable by virtue of a temperature indicator/colour change as discussed further below.

In some embodiments, the lactation aid may further comprise a vibration element configured to vibrate at least the outer layer.

In some embodiments, the lactation aid may comprise a temperature indicator adapted to indicate a temperature of all or part the lactation aid. The temperature indicator may form part of the outer layer or be located in the cavity, e.g. by forming part of the core material. The outer layer of the lactation aid may be at least partially transparent and the temperature indicator may be at least partially visible through the outer layer. The temperature indicator may comprise a thermochromic substance, such as a thermochromic dye, which can change temperature. The dye may be selected to change colour at a threshold temperature. At temperatures above the threshold temperature, discomfort and/or damage to breast tissue may occur. The threshold temperature may be between 60° C. and 85° C., for example.

In one aspect of the present disclosure there is provided lactation apparatus comprising the lactation aid and a handle, the lactation aid being rollably mounted to the handle. A channel may extend at least partially through the lactation aid and at least part of the handle may extend into the channel, although other mounting arrangements are possible. The lactation aid may be removably mounted to the handle so that it can be heated or cooled while unmounted from the handle.

As described herein, a lactation aid may be provided with hot/cold massaging and compression capabilities which is manually applied directly to the breast of a lactating female (including females who are or may soon be breastfeeding, pumping breast milk and/or expressing breast milk), and is designed to aid lactation in a number of ways. The lactation aid's key applications and benefits include, for example the ability to: stimulate/reduce milk production (as desired); and/or assist in un-blocking milk ducts; and/or reduce and relieve the symptoms of mastitis.

Whilst the lactation aid is primarily intended to be used in relation to lactation applications, the lactation aid may also assist in the prevention and relief of other breast related issues, including lymphedema. The lactation aid has the ability to aid lactation due to: the qualities and physical design of the lactation aid (including for example, the protrusions (which may be spikes/lumps/bumps) of the lactation aid); and/or the hot/cold capabilities of the lactation aid; and/or the manual application of the lactation aid directly to the breast (including massaging and/or compression which may be achieved by way of movement of the lactation aid over the breast); and/or the ability of the lactation aid to provide one or more of the above benefits while simultaneously breastfeeding/expressing breast milk/pumping breast milk.

The lactation aid may allow for the possibility of the use/benefit of all of these factors simultaneously, which may cumulatively enhance the benefits and effects.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

BRIEF DESCRIPTION OF DRAWINGS

By way of example only, embodiments are now described with reference to the accompanying drawings in which.

DESCRIPTION OF EMBODIMENTS

Figure 1:
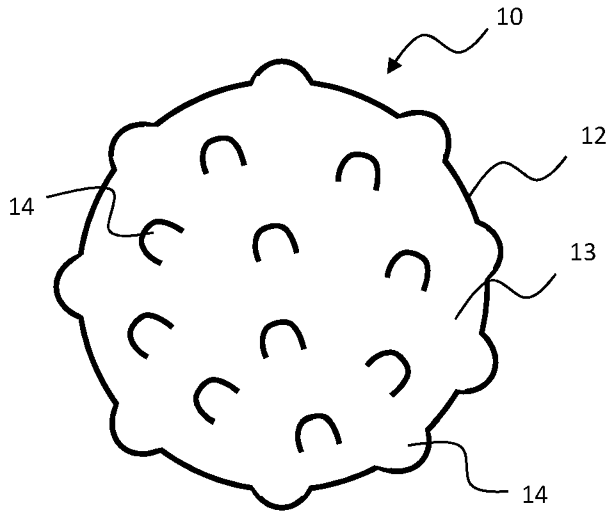
FIG. 1 is an elevation view of a lactation aid according to an embodiment of the present disclosure.
Figure 2:
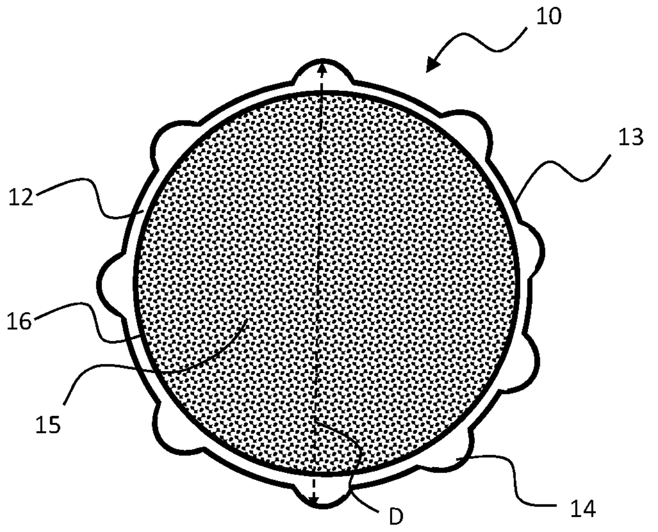
FIG. 2 is a diametrical sectional elevation of the lactation aid of FIG. 1.

FIGS. 1 and 2 show front and cross-sectional views of a lactation aid 10 according to an embodiment of the present disclosure. The lactation aid 10 includes an outer layer 12 having an exterior surface 13 and defining a cavity 16. A core material 15, and more particularly a gel in this embodiment, is located in the cavity 16. The core material 15 is adapted to be one or more of: heated and cooled.

In this embodiment, the outer layer 12 seals the cavity 16 so that the core material 15 is securely and permanently contained therein. Moreover, a plurality of protrusions 14 are provided at the exterior surface of the outer layer 12. The protrusions 14 are illustrated as bumps in this embodiment, but may generally be spikes, lumps, bumps, or combinations thereof. The protrusions 14 extend radially outwardly from the exterior surface 13 of the outer layer 12. In this embodiment, the protrusions are integrally formed with the outer layer 12, are rounded and are evenly distributed across the exterior surface 13.

The lactation aid 10 is spherical in this embodiment. The spherical shape of the lactation aid is defined by the exterior surface 13 of the outer layer. The inclusion of protrusions on the exterior surface, while irregular in nature, does not disguise the general spherical shape of the lactation aid.

Figure 3:
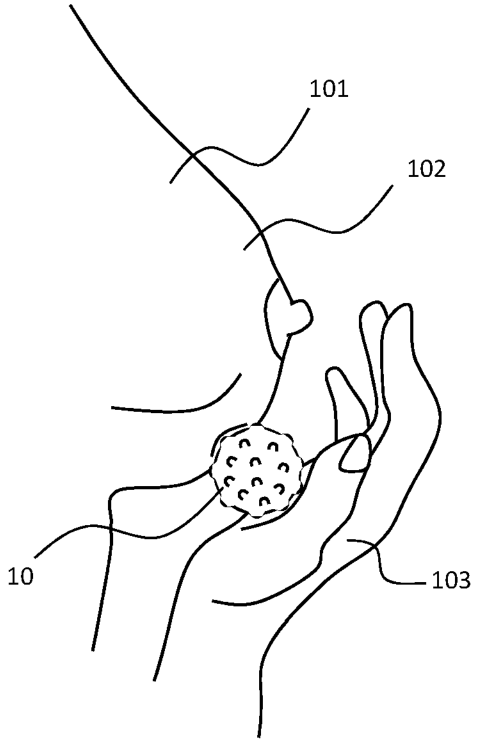
FIG. 3 is an illustrative view of a method according to the present disclosure of applying the lactation aid of FIG. 1 to a breast.

A method of using the lactation aid 10 according to an embodiment of the present disclosure is represented in FIG. 3. The lactation aid 10 is applied to a breast 101 by a user pressing the lactation aid between the surface 102 of the breast 101 and the user's hand 103. The user rolls the lactation aid 10 over the surface of the breast 101 in one or more random directions and/or different directions as required. The user may also press, twist or rub the lactation aid 10 against the breast 101 if desired or required.

Figure 4:
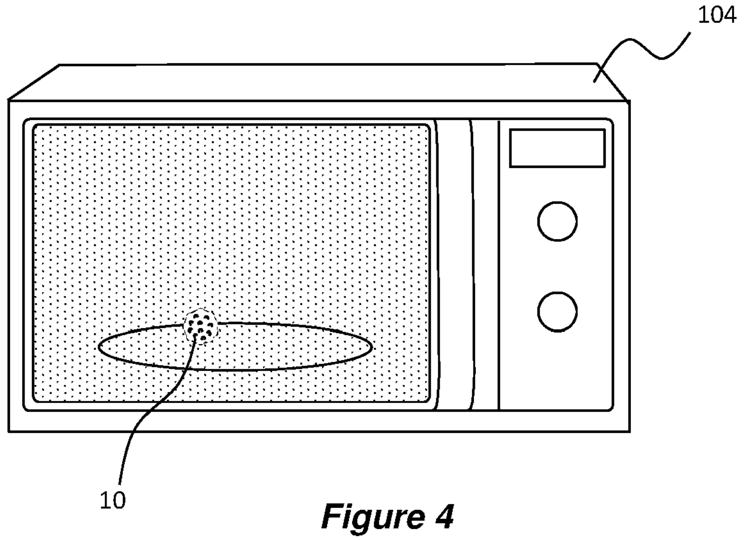
FIG. 4 is an illustrative view of a process of heating the lactation aid prior to the application of the lactation aid to a breast as illustrated in FIG. 3.

In this embodiment, prior to applying the lactation aid 10 to the breast 101, the core material 15 is placed by the user in a heated state (albeit in alternative embodiments it may be placed by the user in a cooled state and, moreover, use of the lactation at room temperature is not precluded). The user can heat the core material 15 to a desired temperature through use of an electrical heating device such as a microwave 104 as represented in FIG. 4, for example.

When the lactation aid 10 is applied to the breast 101, heat may be transferred to or from the breast tissue, lateral movement may be applied to breast tissue and compression may be applied to breast tissue. The lactation aid 10 may therefore combine three critical therapeutic components: (i) application of temperature (heating or cooling) to breast tissue, (ii) movement to breast tissue and (iii) compression of breast tissue. As a result, the lactation aid 10 may be used, for example, to stimulate milk production and flow, aid the let-down reflex; help clear blocked milk ducts; help with oversupply of milk and engorgement; relieve swelling and pain associated with breast feeding or lactation; help fight off infection and prevent escalation of breast swelling (assisting opening of milk ducts and flow); and/or increase the quality of milk by increasing total solids, lipids, and casein concentration and gross energy.

Figure 5:
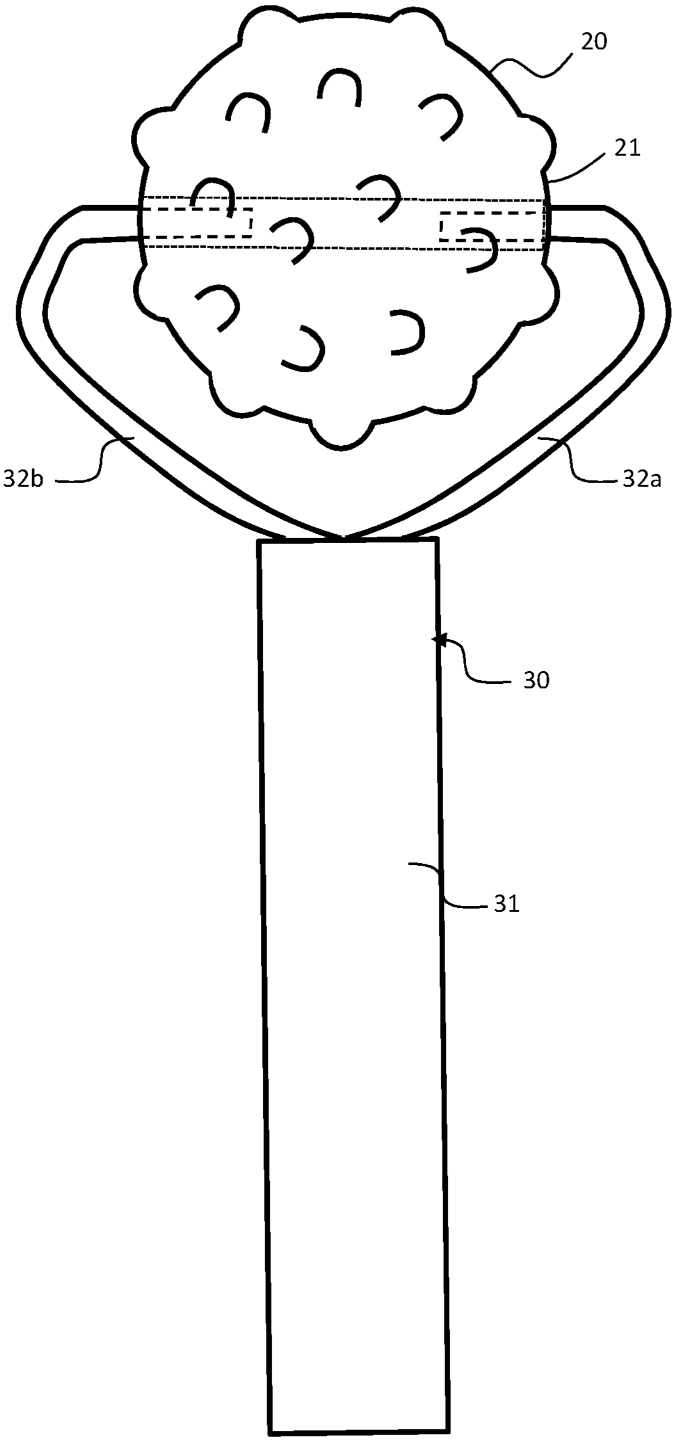
FIG. 5 is an elevation view of lactation apparatus according to an embodiment of the present disclosure.

With reference to FIG. 5, lactation apparatus according to an embodiment of the present disclosure is provided in which a lactation aid 20 is mounted to a handle 30. The lactation aid 20 is rollably mounted to the handle 30. The lactation aid 20 is substantially the same as the lactation aid 10 described above with reference to FIGS. 1 to 4 except that a channel 21 extends through the lactation aid 20, generally across a central diameter of the lactation aid 20. The handle 30 includes a grip portion 31 and two opposing arms 32*a*, 32*b* extending distally from the grip portion 31. The arms 32*a*, 32*b* are resiliently flexible, configured so that they can be pried apart from each other. When pried apart, ends of the arms 32*a*, 32*b* can be inserted into opposing ends of the 21 channel to effect the rollable mounting of the lactation aid 20 to the handle 30, or to dismount the lactation aid 20 from the handle 30. The lactation aid 20 may be dismounted from the handle for the purpose of heating or cooling or otherwise. In use, instead of the lactation aid 20 being pressed directly between a user hand and a breast, a user may hold the handle 30 in order to manually apply/roll the lactation aid 20 over the breast.

Figure 6:
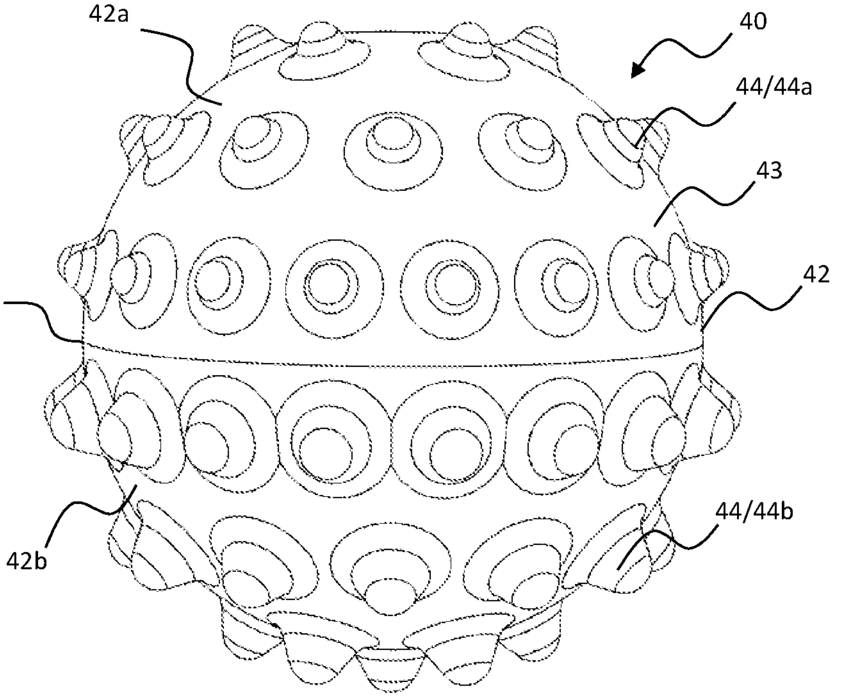
FIG. 6 is an elevation view of a lactation aid according to an embodiment of the present disclosure.
Figure 7:
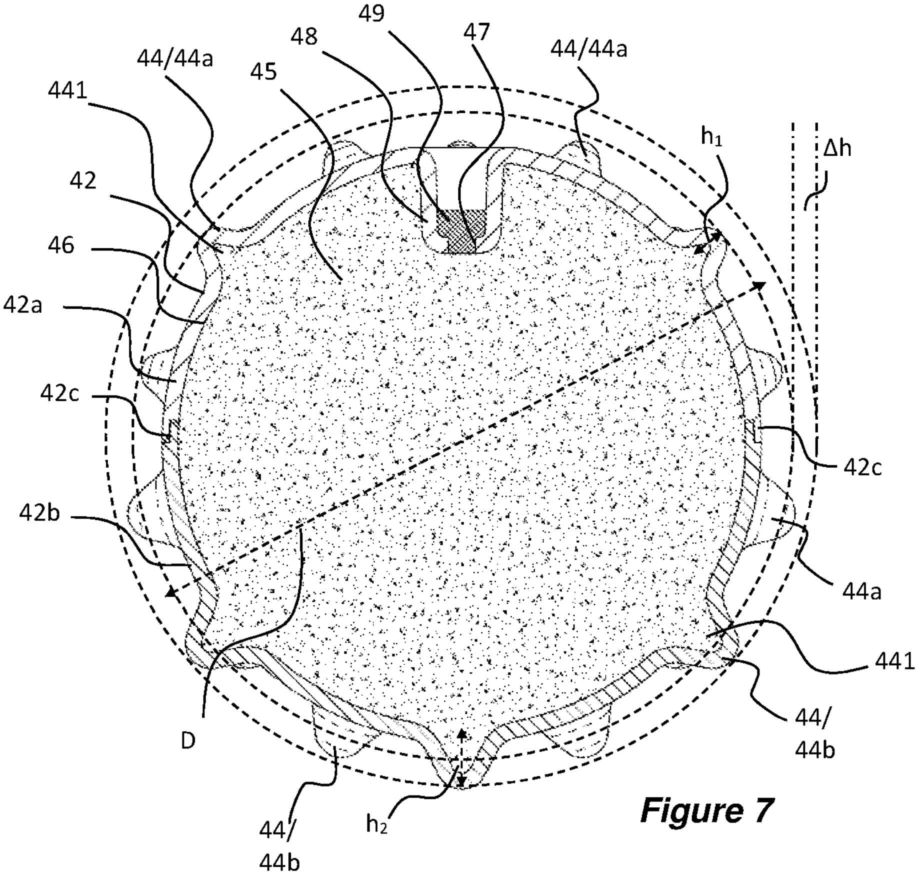
FIG. 7 is a diametrical sectional elevation of the lactation aid of FIG. 6.
Figure 8:
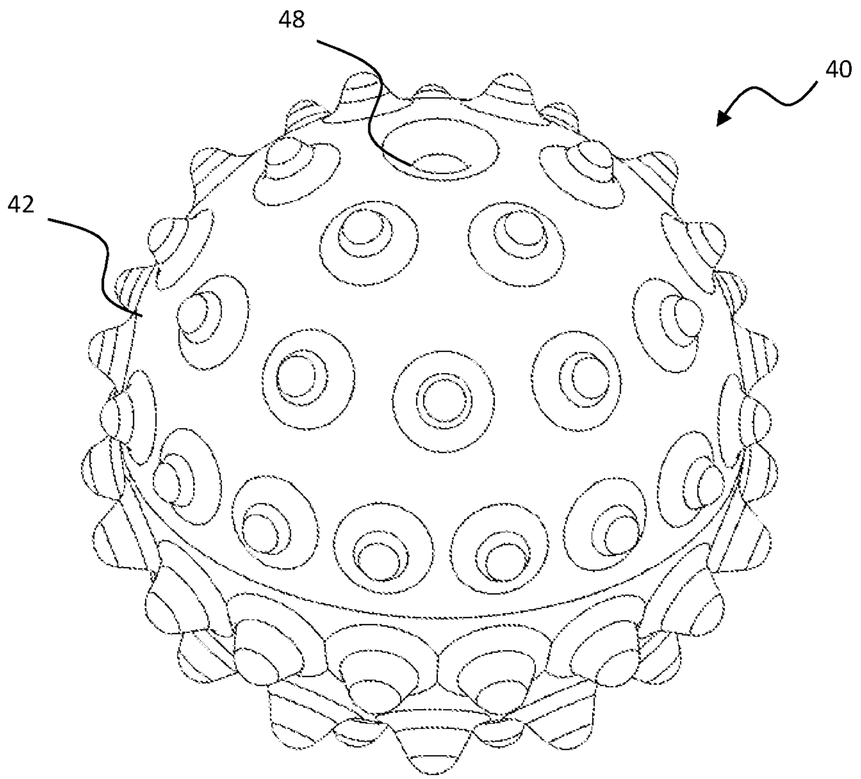
FIG. 8 is a further elevation view of a lactation aid according to an embodiment of the present disclosure.

With reference to FIGS. 6 to 8, a lactation aid 40 according to another embodiment of the present disclosure is now described. The lactation aid 40 again includes an outer layer 42 having an exterior surface 43 and defining a cavity 46. A core material 45 is located in the cavity 46. The core material 45 is adapted to be one or more of: heated and cooled. Moreover a plurality of protrusions 14 are again provided at the exterior surface 43 of the outer layer 42. The protrusions 44 are illustrated as bumps in this embodiment, but may generally be spikes, lumps, bumps, or combinations thereof. The protrusions 44 extend radially outwardly from the exterior surface 43 of the outer layer 42. In this embodiment, the protrusions are integrally formed with the outer layer 42, are rounded and are distributed across the exterior surface 13.

In this embodiment, the cavity 46 is filled with core material 45 via an opening 47 in the outer layer 42. The opening 47 is provided at a bottom end of a recess 48 in the outer layer and is sealed using a plug 49.

In this embodiment, as seen in FIG. 7, the protrusions 44 are hollow. The cavity 46 defined by the outer layer 42 reaches into the protrusions 44 and the core material 45 therefore extends into the protrusions 44. The hollow protrusions 44 enable heated or cooled core material 45 to be closer to breast tissue during use, rather than being spaced from the breast tissue by the height of the protrusions. Moreover, the hollow protrusions enable the outer layer 42, at least in this embodiment, to have substantially the same thickness around its entire circumference, even where it provides the protrusions 44. As such, the outer layer 42 has relatively uniform flexibility and/or compressibility all over.

The maximum diameter D of the lactation aid 40 as defined by the outer layer 12 is about 50 mm in this embodiment, the lactation aid 40 being similar in size to a standard golf ball.

In this embodiment, the outer layer 42 is formed of different sections having different configurations. The different sections are specifically a first half 42*a* and a second half 42*b* of the outer layer 42. The first half 42*a* includes a first subset of protrusions 44*a* and the second half 42*b* includes a second subset of protrusions 44*b*. The protrusions 44*b* of the first subset each have a first height and the protrusions 44*b* of the second subset each have a second height, different from the first height. In this embodiment, the protrusions 44*a* of the first subset 44*a* each have a height $h_1$ of about 2 mm and the protrusions of the second subset each have a height $h_2$ of about 4 mm. The protrusions 44, 44*a*, 44*b* may have a height of at least 1 mm, at least 2 mm or at least 3 mm. The protrusions 44, 44*a*, 44*b* may have a height of less than 10 mm, less than 8 mm or less than 6 mm. In this embodiment, the difference in height $\Delta h$ ($h_2-h_1$) is approximately 0.5 mm, 1 mm or 1.5 mm, for example.

In some embodiments, the different sections 42*a*, 42*b* of the outer layer 42, in addition or as an alternative to having differently configured protrusions 44, 44*a*, 44*b*, may be formed of material having different properties, e.g., hardness properties. By providing different sections with configurations and/or properties, the lactation aid 40 may provide for different therapeutic benefits; the different sections may offer different temperature, movement and/or compression characteristics. The different benefits 40 may be experienced during a single use of the lactation aid 40, e.g., by the different sections 42*a*, 42*b* being rolled one after the other over the breast, or be selectively experienced, by only one or a select group of section being applied to the breast and not one or more other sections.

In this embodiment, the first and second halves 42*a*, 42*b* are separately formed and connected together at a joint region 42*c*, to form the outer layer 42 and the cavity 46. Nevertheless, in alternative embodiments the halves 42*a*, 42*b* may be integrally formed.

In this embodiment, the lactation aid 40 includes a temperature indicator adapted to indicate a temperature of all or part the lactation aid. The temperature indicator is provided by a thermochroic dye that is mixed into the core material 45. The outer layer 42 is at least partially transparent such that changes in the colour of the thermochroic dye within the cavity 46 can be seen by the user. The dye may be selected to change colour at a threshold temperature. At temperatures above the threshold temperature, discomfort and/or damage to breast tissue may occur. The threshold temperature may be between 60° C. and 85° C., for example. In alternative embodiments, a temperature indicator may be provided at the exterior surface of the lactation aid or otherwise.

Although not illustrated, in some embodiments, the lactation aid may further comprise a vibration element configured to vibrate at least the outer layer.

Shape

The shape of lactation aids according to the present disclosure affects the surface area of the lactation aid that makes contact with the breast, which in turn affects the resulting pressure on the breast. Additionally, the shape affects the maneuverability of the lactation aid. The lactation aid should be able to be rolled over different areas of the breast in random and different directions as required (including close to underarms and over lumps, etc.).

The shape of the lactation aids 10, 20, 40 as described in preceding embodiments is an irregular spherical or spherical shape. However, other rollable shapes may be employed. The lactation aid may be ball-shaped. The lactation aid may be substantially spheroidal, e.g., shaped as a prolate spheroid, oblate spheroid or a sphere. The lactation aid may be substantially cylindrical, elongate, ovoid or egg-shaped, regular or irregular in shape or otherwise.

Some shapes may be better suited to different areas or purposes of the lactation aid. For example, a cylindrical shape may be more suited to encouraging milk flow from the top of the breast to the nipple. An ovoid shape may be more suited for reaching under the breast or under the arm, for example.

Size

The lactation aid may have a size that enables it to be easily handled. Indeed the intention is that the application of the lactation aid to the breast is straightforward especially for hard to reach areas and also anticipating that the application may often be undertaken in conjunction with other activities (holding a baby, breastfeeding, pumping, showering etc.).

Preferably the lactation aid should be able to fit comfortably within one, usually female, adult hand. However, ideally it is large enough to manoeuvre easily, exert a functional amount of pressure on the breast tissue and cover breast tissue within a reasonable timeframe. The size of the surface area of the lactation aid which makes contact with the breast also affects the amount of breast tissue that can be acted upon within a certain time frame.

At a basic level, the lactation aid may therefore be smaller than a tennis ball but larger than a marble to ensure suitable maneuverability, pressure application and area coverage. For example, a maximum diameter of the lactation aids, as defined by their outer layer, may be between about 20 mm and 60 mm, between about 40 mm and 60 mm, between about 45 mm and 55 mm, or about 45 mm, about 50 mm or about 55 mm, for example. As indicated above, the lactation aid may have a diameter that is more akin to a standard golf ball (about 43 mm) than a standard tennis ball (about 67 mm).

As a consequence of its size, the lactation aid may be advantageously compact and lightweight making it easily portable and easily stored.

The size and shape of the lactation aid together may mean that the lactation aid is adapted to suit all breast sizes and shapes unlike static nursing garments or heat packs. Nevertheless, it is conceived that differently sized and/or shaped lactation aids may be provided and selected by a user.

Materials

The outer layer of the lactation aids 10, 20, 40 may comprise soft elastomeric material. The outer layer may comprise silicone, rubber, polyethylene, nylon, a thermoplastic polyamide, phthalate free vinyl chloride or a combination thereof.

The outer layer may be thermally conductive so that it can be directly cooled or heated at least partially by the same method as the core material and/or so that heat is transferred from or lost to the core material.

The outer layer of the lactation aid may be formed of a waterproof material. Accordingly, the lactation aid may be waterproof/impervious. Thus the lactation aid can be heated or cooled in liquids and may be washed or sterilised easily such as via heat or chemical sterilization.

Furthermore, a waterproof configuration may also be used while bathing or showering and may be used in conjunction with creams, water-based gels or oils. Use of creams, gels or oils in combination with the lactation aid may mimic the feel of the baby's mouth which may improve the milk let-down reflex.

The core material may be a liquid or fluid suitable for heating/cooling or reheating/cooling. The core material may have a relatively high thermal density or high specific heat capacity such that it may be maintained at or close to the desired temperature for a relatively long period. For example, the core material may be water, a saline solution, or a gel as described above. In some embodiments, the core material may comprise propylene glycol, calcium chloride, magnesium sulphate, ammonium nitrate or a combination thereof.

The thickness of the outer layer is dependent on the choice of material and its ability to contain the gel inner core. Generally, the outer layer may be relatively thin, e.g. by having a thickness of less than 3 mm, less than 2 mm or less than 1 mm in depth.

Advantageously the lactation aid may require no power or assembly by the user and there may be no mechanical, electrical and/or replacement parts.

Hardness

The hardness of the lactation aids 10, 20, 40 may affect their performance. It is desirable that the hardness of the lactation aid is within a certain range. If the lactation aid is too soft (such as a sponge) then there is unlikely to be a discernible effect on the breast tissue. If the lactation aid is too hard (such as a cricket ball) then the lactation aid could cause damage to the breast tissue.

The outer layer may have a Shore 00 hardness of between 15 and 80, between 20 and 65, between 20 and 50 or between 2 and 40, for example. The outer layer may have a hardness between Shore 00 of 20 and Shore A of 20, for example. The outer layer may be relatively thin, e.g. less than 3 mm, less than 2 mm or less than 1 mm in depth. The softness of the outer layer of the lactation aid, and the choice of core material, may provide the lactation aid with a 'jelly-like' nature.

The lactation aids 10, 20, 40 may be substantially soft and relatively easily compressed or deformed. Each lactation aid may be considered "jelly-like" "squidgy" or "squashy", particularly through use, for example, of a flexible, polymeric outer layer and a liquid or gel core material. The core material may not fill the cavity of the outer layer at a high pressure. At room temperature, the core material may be substantially at atmospheric pressure. The core material may not inflate the outer layer by stretching the outer layer, but rather fill the cavity to a fixed maximum diameter as defined by the outer layer.

The lactation aid may have a modulus of elasticity that substantially matches the perceived/required modulus of elasticity of the breast/breast tissue. For example, the modulus of elasticity of the lactation aid may be between 0.5 kPa and 3,000 kPa. For example, the modulus of elasticity of the lactation aid may be less than 3,000 kPa, less than 2,500 kPa, less than 1,000 kPa, less than 500 kPa, less than 100 kPa, less than 50 kPa, less than 25 kPa, less than 10 kPa or otherwise.

The outer layer may be variable in stiffness and, in addition to the character of the core material, this may be so that the lactation aid has a "maximal pressure" that it can exert on breast tissue, no matter how hard the ball is pressed to tissue, by allowing flaccid expansion of the outer layer when a deemed maximal pressure is reached. This may be used to reduce the possibility of harmful pressure being applied to the breast tissue.

The core material may have variable elastic properties. These non-linear properties may be thixotropic (to allow for softening and broadening of the applied force to the breast where excessive force may be painful or harmful—this is similar to the material property of toothpaste for example), non-Newtonian where the increased application of deformation serves to stiffen the material (much as cornflour and water behaves) and in this fashion may "sharpen" or increase the effective application of force, much as may be required to dislodge a blockage, or a combination of these, where the material behaves elastically then becomes either of thixotropic or non-Newtonian or both at differing rates of application.

The core material may be thermoplastic so it can be set to different elasticities at different temperatures. This accounts for the fact that different breasts have different moduli, that within any one breast there may be variable regions of stiffness, and that various disease states and normal physiological variations (such occur during lactation) may be present and thereby require differing treatment elasticities. These differing elastic states may be signified by differing temperature measurement properties, which may be observable by virtue of the temperature indicator/colour change.

Protrusions

The plurality of the protrusions at the exterior surface of the outer layer of the lactation aids 10, 20, 40 may be in the form of rounded spikes or more flattened bumps or a combination thereof. The protrusions may not be pointed to the extent that they could damage breast issue, but pointed enough to effectively reach deep enough into breast tissue to transfer temperature and pressure to the lactiferous ducts.

The shape and size of the protrusions, their thickness and arrangement may vary and illustrations are examples only.

Temperature

When the lactation aids 10, 20, 40 are applied to the breast, the desired heat or cold can, in effect, be transferred from the core material to the breast tissue.

The core material may be heated to a desired, therapeutic temperature that is substantially above the surrounding room or atmospheric temperature, e.g. at least 5° C., at least 10° C., at least 15° C., at least 20° C., at least 30° C., at least 40° C., at least 50° C., or at least 60° C. above the room or atmospheric temperature. For example, the core material may be heated to a desired temperature of at least 25° C., at least 30° C., at least 35° C., at least 40° C., at least 50° C., at least 60° C., at least 70° C., or at least 80° C. As another example, the core material may be cooled to a desired, therapeutic temperature that is substantially below the surrounding room or atmospheric temperature, e.g. at least 5° C., at least 10° C., at least 15° C., or at least 20° C. below the room or atmospheric temperature. For example, the core material may be cooled to a desired temperature of below 15° C., below 10° C., below 5° C., or below 0° C. In some embodiments, the core material may be frozen. Nevertheless, use of the lactation aid while the core material is at room temperature is not precluded.

The heat/cold may be transferred deep into the breast tissue via the protrusions, including through use of hollow protrusions in some embodiments. This can enable temperature to be transferred more effectively and directly to mammary glands, lactiferous ducts, milk blockages and the lymphatic system.

Heating the core material to the desired temperature may comprise heating using an electrical heating device such as a microwave oven or other type of oven, heating by immersion in a hot fluid such as hot water, or otherwise. Cooling the core material to the desired temperature may comprise cooling using an electrical refrigeration device (e.g. placing the aid in a fridge or freezer), cooling by immersion in a cold fluid such as cold water, or otherwise. Nevertheless, in some embodiments, the core material may have "instant" heating or cooling properties. For example, the lactation aid may be configured so that an exothermic or endothermic reaction can be triggered to cause instant heating or instant cooling of the core material. In this regard, the lactation aid may comprise core material and/or additional trigger elements that are common to "instant heat packs" or "instant cool packs" that are known in the art.

In some embodiments, the lactation aid may be used with a bespoke heating or cooling device, which may have a chamber specifically design for receiving the lactation aid. The chamber may be surrounded by walls of a high thermal density which can retain a heated or cooled state for a long period of time. The lactation aid may be repeatedly placed into the chamber to be re-heated or re-cooled.

The heated lactation aid can be applied to breast tissue to help reduce pain, remove or decrease blockages of the lactiferous ducts and to promote lactation. Heat also improves blood flow to the tissue which may help lactation and also help the immune system fight localised infection. Heat may also be used to prevent or treat Raynaud's phenomenon (vasospasm) of the nipple.

For lactating women it may be desirable to apply heat prior to breast feeding or expressing milk and continuing to apply heat to the breast tissue while breast feeding or expressing milk. It may then be desirable to use cold therapy for milk resorption and to reduce swelling and pain.

Compression and Movement

The lactation aids 10, 20, 40 are manually applied to the skin of the breast which selectively compresses breast tissue as desired. Alternatively the lactation aid may be used over clothes or garments such as maternity bras. The user can apply increased pressure via hand to increase localised pressure to desired areas of the breast as required.

Localised pressure bio-mimics hand massage or a baby suckling and provides the physical stimulus for the let-down reflex. Furthermore localised pressure also assists the smooth muscle tissue in moving milk from the mammary gland through the lactiferous ducts to the nipple. Localised pressure can also reduce or remove blockages of the lactiferous ducts and promote blood circulation and fluid flow in the desired area.

The plurality of protrusions apply additional pressure and reach deeper into the breast tissue closer to the lactiferous ducts.

The lactation aid can be applied to desired areas in a random or patterned manner. Preferably, milk is encouraged to flow towards the nipple. This may include depth rhythmic "kneading", rolling or comb like dragging motion towards the nipple or movement in concentric circles towards the nipple or over an affected area. Rhythm, rate and pressure can be varied as required.

The compression provided by the lactation aid may help move the hindmilk with heavy with fat globules towards the nipple which is important for infant nutrition.

Combined Effect

The lactation aids 10, 20, 40 may promote lactation in a number of ways. Firstly the lactation aid can improve the let-down reflex. The lactation aid does this by tactile stimulation of the breast tissue and bio-mimicking the motion, temperature and sensation of a baby suckling. The let-down reflex is also improved when a lactating woman is relaxed. Application of the lactation aid may also assist in relaxing the user. Physical and visual contact with a baby also helps the let-down reflex thus the nature of the device being able to be applied with one hand is ideal if the user is also holding a baby.

The combined application of heat and manual compression can encourage flow of milk towards the nipple and also aids in the movement of milk clogs and heavy fat globules.

The application can both increase milk volume and quality such as concentration of solids, lipids, casein and gross energy.

Use of the lactation aid on breast tissue may contribute towards skin rejuvenation and improved breast skin tone. The lactation aid may be used in combination with creams, gel or oils known to assist with skin tone and/or decrease the visibility of stretch marks.

The invention claimed is:

1. A breast aid comprising:

an outer layer defining a cavity, the outer layer being formed of an elastomeric material having a Shore 00 hardness of between 15 and 80, wherein the outer layer is spherical and comprises a plurality of protrusions extending radially outwards from an exterior surface of the outer layer, the plurality of protrusions comprising:

a first subset of protrusions distributed across a first half of the outer layer, each protrusion of the first subset of protrusions having a first height; and a second subset of protrusions distributed across a second half of the outer layer that is opposite to the first half of the outer layer, each protrusion of the second subset of protrusions having a second height higher than the first height, wherein a radius of a notional hemisphere extending across tips of the protrusions of the second subset of protrusions is larger than a radius of a notional hemisphere extending across tips of the protrusions of the first subset of protrusions, and wherein one or more of the plurality of protrusions are hollow and one or more of the plurality of protrusions are non-hollow; and a core material located in the cavity and in contact with an inner surface of the outer layer, the core material being a liquid or gel and substantially at atmospheric pressure when at room temperature, the core material being adapted to be one or more of: heated and cooled, wherein the core material at least partially extends into the hollow protrusions, wherein the breast aid is substantially ball-shaped, wherein the breast aid is adapted to be manually rolled over a breast, wherein a modulus of elasticity of the entire breast aid is between 0.5 kPa and 10 kPa, and wherein a thickness of the outer layer is less than 3 mm.

2. The breast aid of claim 1, wherein the plurality of protrusions are integrally formed with the outer layer and are spikes, lumps or bumps or a combination thereof.

3. The breast aid of claim 2, wherein the outer layer has substantially the same thickness at areas where hollow protrusions are formed and at areas with no protrusions.

4. The breast aid of claim 2, wherein the protrusions have:

a height of at least 1 mm, at least 2 mm or at least 3 mm; and/or a height of less than 10 mm, less than 8 mm or less than 6 mm.

5. The breast aid of claim 2, wherein the difference between the first height and the second height is at least 0.5 mm, at least 1 mm or at least 1.5 mm.

6. The breast aid of claim 5, wherein the first and second halves of the outer layer are separately formed and connected together to form the cavity.

7. The breast aid of claim 1, wherein the core material is adapted to be heated to at least 50° C.

8. The breast aid of claim 1, wherein the core material is adapted to be cooled to 5° C. or below.

9. The breast aid of claim 1, wherein the core material is adapted to be at least one of repeatedly heated and repeatedly cooled.

10. The breast aid of claim 1, wherein the core material comprises water, a gel, a saline solution or a combination thereof, and/or wherein the core material comprises propylene glycol, calcium chloride, magnesium sulphate, ammonium nitrate or a combination thereof.

11. The breast aid of claim 1, wherein a maximum diameter of the breast aid as defined by the outer layer is between about 20 mm and 60 mm, or is between about 45 mm and 55 mm, or is about 50 mm.

12. The breast aid of claim 1, wherein the outer layer is formed of silicone, rubber, polyethylene, nylon, a thermoplastic polyamide, phthalate free vinyl chloride or a combination thereof.

13. The breast aid of claim 1, wherein the outer layer has a hardness between Shore 00 of between 20 and 65, or between Shore 00 of 20 and Shore A of 20.

14. A method of aiding lactation, the method comprising:

manually rolling the breast aid according to claim 1 over a breast.

15. A device comprising:

an outer layer defining a cavity, the outer layer being formed of an elastomeric material having a Shore 00 hardness of between 15 and 80, wherein the outer layer is spherical and comprises a plurality of protrusions extending radially outwards from an exterior surface of the outer layer, the plurality of protrusions comprising:

a first subset of protrusions distributed across a first half of the outer layer, each protrusion of the first subset of protrusions having a first height; and a second subset of protrusions distributed across a second half of the outer layer that is opposite to the first half of the outer layer, each protrusion of the second subset of protrusions having a second height higher than the first height, wherein a radius of a notional hemisphere extending across tips of the protrusions of the second subset of protrusions is larger than a radius of a notional hemisphere extending across tips of the protrusions of the first subset of protrusions, wherein one or more of the plurality of protrusions are hollow and one or more of the plurality of protrusions are non-hollow; and a core material located in the cavity and in contact with an inner surface of the outer layer, the core material being a liquid or a gel and substantially at atmospheric pressure when at room temperature, the core material being adapted to be one or more of: heated and cooled, wherein the core material at least partially extends not the hollow protrusions, wherein the device is substantially ball-shaped, wherein the device is adapted to be manually rolled over body tissue, wherein a modulus of elasticity of the entire breast aid is between 0.5 kPa and 10 kPa, and wherein a thickness of the outer layer is less than 3 mm.

* * * * *